(12) United States Patent
Antonini et al.

(10) Patent No.: US 7,056,464 B2
(45) Date of Patent: Jun. 6, 2006

(54) METHOD OF FORMING A STEEL INSERT FOR MOLDED RUBBER PART

(75) Inventors: Joseph Antonini, Chicago, IL (US); Daniel Battistoni, W. Chicago, IL (US)

(73) Assignee: Dana Corporation, Toledo, OH (US)

( * ) Notice: Subject to any disclaimer, the term of this patent is extended or adjusted under 35 U.S.C. 154(b) by 162 days.

(21) Appl. No.: 09/942,250

(22) Filed: Aug. 28, 2001

(65) Prior Publication Data

US 2003/0127772 A1    Jul. 10, 2003

(51) Int. Cl.
*B29C 45/14*    (2006.01)
*B29C 69/00*    (2006.01)

(52) U.S. Cl. .............. 264/255; 264/275; 264/296; 264/325; 264/328.1

(58) Field of Classification Search ............ 264/259, 264/266, 271.1, 279, 296, 325, 328.1, 275, 264/255
See application file for complete search history.

(56) References Cited

U.S. PATENT DOCUMENTS

| | | | |
|---|---|---|---|
| 2,431,393 A | | 11/1947 | Franklin |
| 3,090,996 A | | 5/1963 | Reichenbach et al. |
| 3,490,139 A | | 1/1970 | McKinven |
| 3,619,458 A | * | 11/1971 | Engelhardt .............. 264/260 |
| 3,851,037 A | | 11/1974 | Day et al. |
| 3,875,654 A | | 4/1975 | Ushijima |
| 4,096,228 A | * | 6/1978 | Decker .................. 264/276 |
| 4,957,680 A | | 9/1990 | Saxod et al. |
| 5,618,050 A | * | 4/1997 | Jeanne et al. ........... 277/591 |
| 6,062,573 A | * | 5/2000 | Budovec et al. ........ 277/598 |

* cited by examiner

*Primary Examiner*—Edmund H. Lee
(74) *Attorney, Agent, or Firm*—Rader, Fishman & Grauer PLLC

(57) ABSTRACT

An insert for a combustion head gasket seals a coolant or oil aperture. The insert is manufactured separately from the main gasket structure, and is formed of two materials, a metallic body and an elastomeric sealing bead bonded thereto. A disclosed method for manufacturing the insert includes shaping the insert body and molding the bead in a single process. The method includes the steps of: (a) providing a mold having an upper section and a lower section, the lower section defining a cavity adapted to receive a blank metal substrate; (b) placing the metal substrate into the mold cavity; (c) closing the upper section against the substrate to hold the insert in place under a first applied force; (d) applying a second force greater than the first to shape the insert; (e) supplying elastomeric material to predetermined selected portions of the blank metal substrate; and (f) curing the elastomeric material.

13 Claims, 3 Drawing Sheets

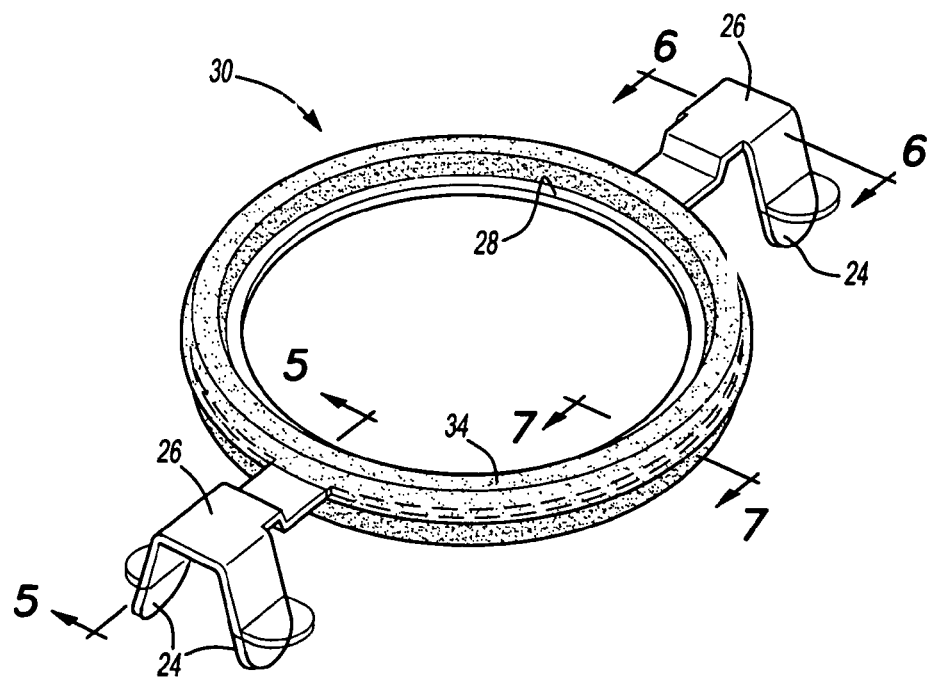
_Fig-4_
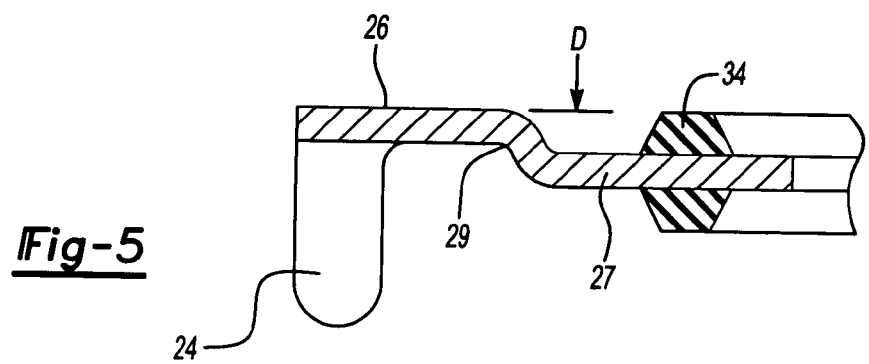
_Fig-5_
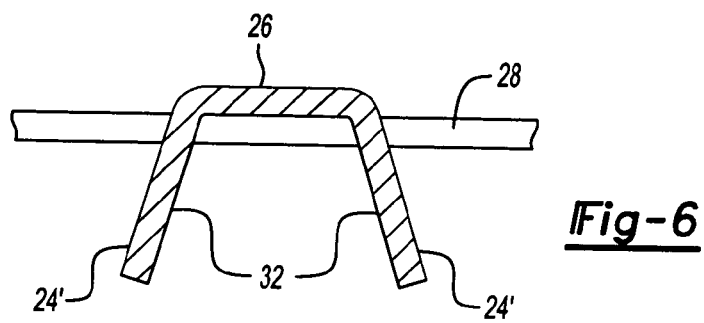
_Fig-6_
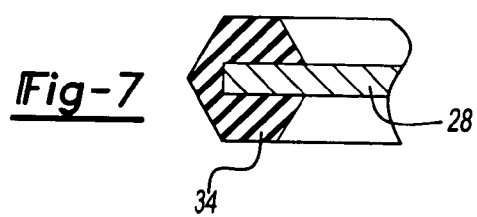
_Fig-7_

METHOD OF FORMING A STEEL INSERT FOR MOLDED RUBBER PART

BACKGROUND OF THE INVENTION

1. Field of Invention

The present invention relates to improved automotive gasket assemblies for internal combustion engines, particularly to improved sealing inserts for combustion cylinder head gaskets applied between engine block and cylinder head structures of said engines, and more particularly to their methods of manufacture.

2. Description of the Prior Art

The manufacture of combustion cylinder head gaskets generally involves forming of (i.e., shaping) metallic cores to which are applied various facing materials such as graphite, as well as various sealing materials including elastomer materials, as will be appreciated by those skilled in the art. The forming of the metallic cores has traditionally required a function separate and distinct from the later application of graphite and elastomer materials to various selectively targeted areas of the core.

One particular area of such application of elastomer involves a gasket insert adapted for providing effective sealing of oil and/or coolant flows along peripheral areas of the gasket spaced from the combustion openings. One manufacturing technique calls for the manufacture of separate insert structures having elastomer sealing portions bonded to apertures of the inserts, generally on both sides of the insert structures.

Normally, the inserts are manufactured separately from the gasket bodies, and are formed in at least two stages; the forming of the metallic insert structure, followed by the bonding to the structure of an elastomeric seal material. It would be a significant accomplishment to be able to form the metallic insert structure in a single process that included the bonding of the elastomeric seal material to the insert.

SUMMARY OF THE INVENTION

The present invention is a method of manufacturing a gasket insert for a combustion gasket designed for sealing between rigid mating engine surfaces, such as between an engine block and a cylinder head. In one described form, the insert is adapted for sealing a plurality of spaced apart apertures situated peripherally or apart from the combustion apertures. The insert is particularly suited for oil or water apertures of a cylinder head gasket, and can be manufactured via a single molding process that involves both of forming of the insert metal structure and the bonding of a sealing elastomer to the structure.

In one described method, the insert is manufactured for a combustion head gasket for sealing the combustion apertures of an engine, wherein the insert is specifically designed to seal a coolant or oil aperture portion of the combustion head gasket. The insert is preferably manufactured separately from the main gasket structure, and is formed of two materials, a metallic body and an elastomeric sealing bead bonded thereto.

A disclosed method for manufacturing the insert includes shaping the insert body and molding the bead in a single process. The method includes the steps of: (a) providing a mold having an upper section and a lower section, the lower section defining a cavity adapted to receive a blank metal substrate; (b) placing the metal substrate into the mold cavity; (c) closing the upper section against the substrate to hold said insert in place under a first applied force; (d) applying a second force greater than the first to shape the insert; (e) supplying elastomeric material to predetermined selected portions of the blank metal substrate; and (f) curing the elastomeric material.

BRIEF DESCRIPTION OF THE DRAWINGS

FIG. 4 is a plan view of the insert shown separately and apart from the combustion gasket of FIG. 1.

FIG. 5 is a cross-sectional view of a connective portion of the insert, as viewed along lines 5—5 of FIG. 4.

FIG. 6 is a cross-sectional view, shown along lines 6—6 of FIG. 4, of the connective portion of the insert prior to its installation into the combustion gasket of FIG. 1.

FIG. 7 is a cross-sectional view, shown along lines 7—7 of FIG. 4, of the sealing portion of the insert.

DETAILED DESCRIPTION OF THE DESCRIBED EMBODIMENTS

Figure 1:
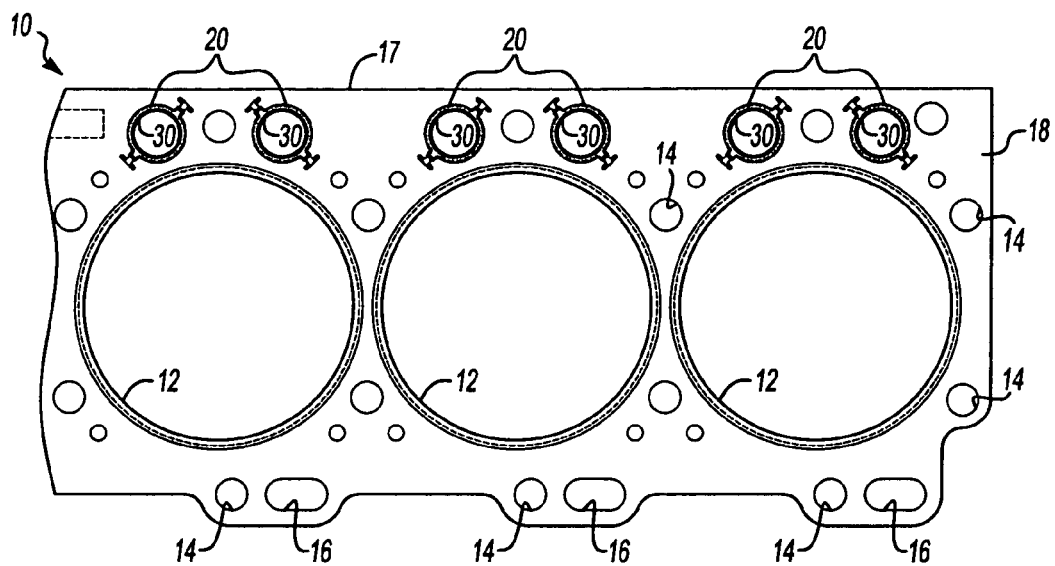
FIG. 1 is plan view of a cylinder head combustion gasket that displays one described embodiment of an insert manufactured in accordance with the method of the present invention.

Referring initially to FIG. 1, a combustion head gasket 10 is shown fragmentarily, and includes a plurality of cylinder bore apertures 12. The gasket 10 also incorporates a number of bolt holes 14 for accommodating passage of bolts to secure a cylinder head against a cylinder block (neither shown), as will be appreciated by those skilled in the art. Other traditional apertures are also included in the gasket 10 including oval shaped cooling apertures 16. All of such apertures are disposed about the generally planar gasket body 18.

Figure 2:
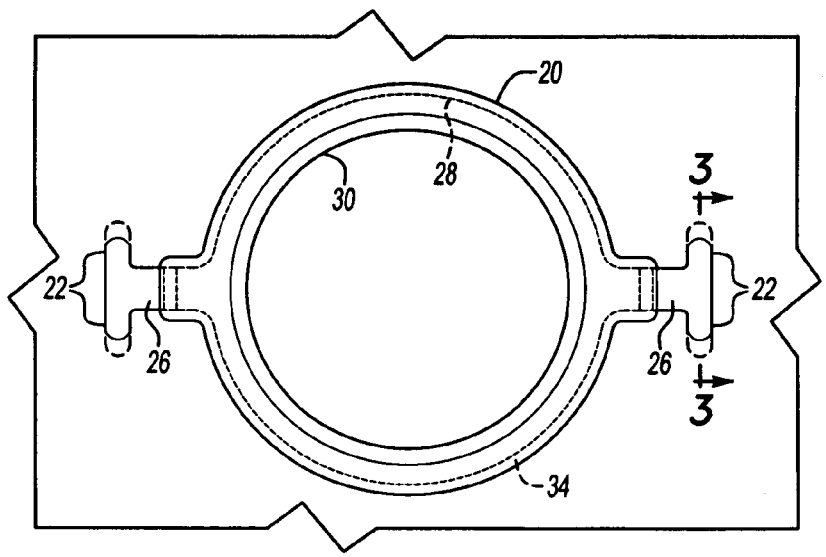
FIG. 2 is an view of an oil flow aperture of the cylinder head combustion gasket of FIG. 1, enlarged to reveal particular details of the insert, particularly with respect to manner of affixation of the insert to the cylinder head combustion gasket.
Figure 3:
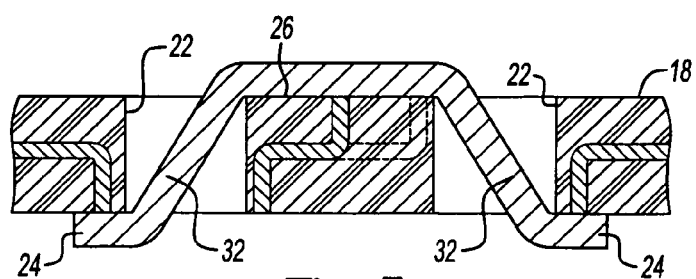
FIG. 3 is a cross-sectional view of a portion of the insert, as viewed along lines 3—3 of FIG. 2.

Of particular importance with respect to the instant invention is the plurality of engine oil flow apertures 20 disposed along an edge 17 of the gasket 10. Referring now also to FIGS. 2 and 3, each of the oil flow apertures 20 contains a sealing insert 30 defining a generally annular sealing body portion 28 at a peripheral edge thereof. Extending radially outwardly spaced apart sides of the body portion 28 are a pair of arms 26 integrally attached to the body portion 28.

Radially outwardly oriented fingers 24 are attached to the arms 26 through V-shaped connecting segments 32. The fingers 24 are adapted to be inserted into and through apertures 22, arranged in pairs on either side of each oil flow aperture 20 in the gasket 10 (FIG. 2), and which are included for such purpose.

Referring now to FIGS. 4, 5, 6, and 7, additional features of the insert are now described in particular detail, as such features will be essential to a full appreciation of the method of manufacturing the insert 30. The insert 30 includes an elastomeric sealing bead 34 disposed fully about its circular body 28. Although shown circular in the embodiment herein described, the apertures 20 and hence inserts 30, are typically non-circular in shape as well.

Referring now specifically to FIG. 5, each arm 26 of the insert is connected to a shoulder portion 27 through an offset elbow 29. The elbow 29 defines an amount of offset shown as a length "D" between the arm and shoulder portions, 26, and 27. Referring to FIG. 6, it will be appreciated that securement of the arms 26 to the gasket body 10 will be effected by the insertion of the fingers 24' into the apertures 22 prior to subsequent securement of the arms 26 to the gasket 10 by the bending of the fingers 24'. The fully secured fingers 24 are as shown in FIG. 3. However, the manufacturing process as described herein provides only relatively straight fingers 24', remaining in line with the V-shaped connecting segments 32, and thus forming inserts adapted to facilitate the installation of the fingers 24' into the apertures 20 of the gasket 10. Thus the fingers 24 are only bent radially outwardly after their insertion into the gasket body 18 during manufacture of the combustion head gasket 10.

Figure 8:
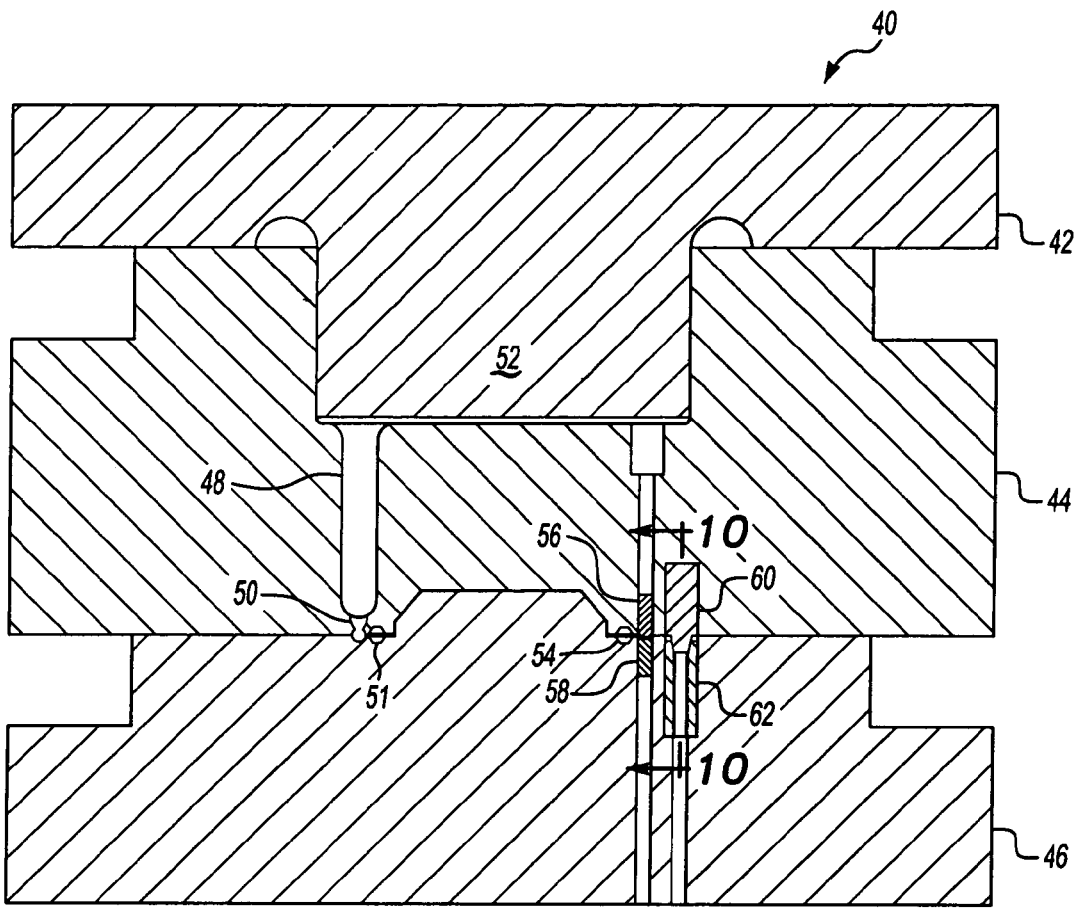
FIG. 8 is a cross-sectional view of a multi-sectional mold apparatus used for manufacturing the insert.

Referring now to FIG. 8, a multiple-sectioned mold 40 is employed for the disclosed method of making the insert 30. The mold 40 includes a top mounted plunger section 42, an intermediately positioned upper mold section 44, and a lower mold section 46. A system of sprues 48 and gates 50 are designed to facilitate flow of an elastomeric material through the upper mold section 44 into the cavity 51 of the lower mold section 46.

The cavity 51 is adapted for the forming or shaping of the annular insert 30 in the lower mold section 46. The insert is placed into the cavity 51 as a flat metal blank (not shown), having the final planar shape of the insert 30.

A method of manufacturing the insert 30 includes the steps of: (a) providing a mold having an upper section 44 and a lower section 46, the lower section defining the cavity 51 adapted to receive the blank metal substrate; (b) placing the substrate into the mold cavity; (c) closing the upper mold section 44 against the substrate to hold the insert in place under a first applied force; (d) applying a second force, for example by means of the top mounted plunger 42, greater than the first force to plastically deform the insert into a predetermined shape; (e) supplying elastomeric material to predetermined selected portions (34) of the blank metal substrate; and (f) curing the elastomeric material.

In the described mold apparatus, the plunger 42 is adapted to supply the first and second forces as necessary to achieve the final product of a completed, i.e. manufactured, insert 30. Moreover, a plunger boss 52 of the plunger 42 is used to force elastomer from the top 45 of the mold section 44, downwardly through the sprues 48 and gates 50, to form an elastomer bead 34 within an annular bead cavity 54 formed at the interface of the upper and lower mold sections 44 and 46, as shown.

Figure 9:
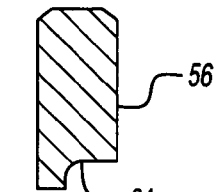
FIG. 9 is an enlarged cross-sectional view of forming die inserts contained in the mold apparatus of FIG. 8.

Continuing reference to FIG. 8, but also referring now to FIGS. 5 and 9, the formation of the elbow 29 for radially offsetting fingers 24 from shoulders 27 of the insert 30 may be described. The upper and lower molds sections 44, 46 contain a pair of mating elbow forming upper and lower die inserts 56, 58. The upper die insert 56 include an upper die forming surface 64 that coacts with a lower die surface 66 of the lower die insert 58. Those skilled in the art will appreciate that the mold 40 thus includes a die forming function to produce the forming of the metal blank as required to produce the insert 30.

Figure 10:
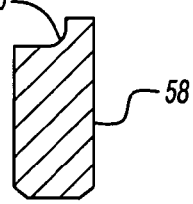
FIG. 10 is an enlarged cross-sectional view of additional forming die inserts contained in the mold apparatus of FIG. 8, as shown along lines 10—10 of FIG. 8.
Figure 10:
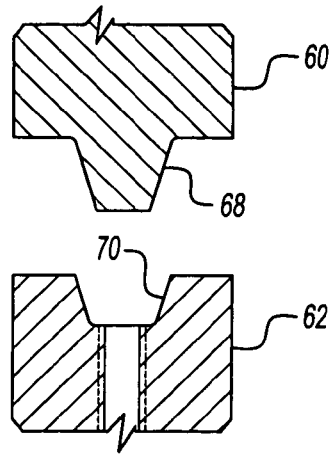

Referring now particularly to FIGS. 6 and 10, a pair of cooperating finger forming upper and lower die inserts 60 and 62 matingly close together within the mold 40 to form the fingers 24 that are attached to the V-shaped segments 32, prior to the bending of the fingers 24 relative to the V-shaped segments 32 as will occur pursuant to attachment of the insert 30 to the gasket (FIG. 3). For this purpose a male finger forming projection 68 extending downwardly from the upper die inserts 60 cooperates with a female receiving surface 70 of the lower die inserts 62, as will be appreciated by those skilled in the art.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. A method for manufacturing an insert for a combustion head gasket comprising the steps of: (a) providing a mold apparatus having an upper mold section and a lower mold section, said lower section defining a cavity adapted to receive a blank metal substrate; (b) placing said blank metal substrate into said cavity; (c) closing said upper mold section against said blank metal substrate to hold said blank metal substrate in place under a first applied force; (d) applying a second force greater than the first force to bend a portion of said blank metal substrate such that the orientation of at least one finger extending from said blank metal substrate relative the blank metal substrate is changed; (e) supplying elastomeric material to selected predetermined portions of said blank metal substrate; and (f) curing the elaston,eric material.

2. The method of claim 1 wherein said insert is adapted to seal an engine oil flow aperture of said combustion head gasket, said blank metal substrate including a body portion adapted for registration with the oil flow aperture.

3. The method of claim 1 wherein said insert is manufactured in a single mold process ihat includes said shaping of said blank metal substrate and said molding of said bead.

4. The method of claim 3 wherein said elastomeric sealing bead bonded to said blank metal substrate comprises a sealing portion disposed about a peripheral edge of said blank metal substrate of said insert.

5. The method of claim 4 wherein said step of supplying includes supplying the elastomeric material to form a closed loop, and wherein said insert further comprises radially extending arms provided for attachment of said insert to the combustion head gasket.

6. The method of claim 5 wherein said second force forms at least one offset elbow.

7. The method of claim 6 wherein said elbow provides a connection between said arm and a shoulder portion of said insert, wherein said shoulder portion is contiguous wit said peripheral edge of said closed loop portion of said insert.

8. The method of claim 7 wherein said closed loop is generally non-circular.

9. The method of claim 8 wherein said mold apparatus comprises die inserts for forming said insert.

10. A method for manufacturing a combustion head gasket comprising the steps of:
 (a) providing a mold apparatus having an upper mold section and a lower mold section, said lower mold section defining a cavity for selectively receiving a blank metal substrate;
 (b) placing said blank metal substrate into said cavity;

(c) closing said upper mold section against said blank metal substrate to hold said blank metal substrate in place under a first applied force;

(d) applying a second force greater than said first force to shape said blank metal substrate, wherein said blank metal substrate is shaped by bending portions of said blank metal substrate such that the orientation of at least one of a plurality of fingers that extend from said blank metal substrate relative another one the plurality of fingers is changed;

(e) supplying an elastomeric material to selected predetermined portions of said blank metal substrate; and (g) inserting said fingers into apertures formed within the gasket.

11. The method of claim 1, wherein said predetermined portions of said metal substrate include opposing, generally planar outer surfaces, and said elastomeric material extends away from said outer surfaces.

12. A method for manufacturing an insert for a combustion head gasket comprising the steps of:

(a) providing a mold apparatus having an upper mold section and a lower mold section, said lower mold section defining a cavity for selectively receiving a blank metal substrate;

(b) placing said blank metal substrate into said cavity;

(c) closing said upper mold section against said blank metal substrate to hold at least a portion of said blank metal substrate in place under a first applied force;

(d) applying a second force greater than said first force to shape at least a section of said blank metal substrate; and (e) supplying an elastomeric material to selected predetermined portions of said blank metal substrate, wherein said predetermined portions of said blank metal substrate are not shaped by said second force.

13. The method of claim 1, wherein said step of supplying elastomeric material to selected predetermined portions of said blank metal substrate include supplying elastomeric material to opposing outer surfaces of said blank metal substrate.

* * * * *